US011977466B1

(12) United States Patent
Gregorio-de Souza et al.

(10) Patent No.: US 11,977,466 B1
(45) Date of Patent: May 7, 2024

(54) USING MACHINE LEARNING TO PREDICT INFRASTRUCTURE HEALTH

(71) Applicant: Riverbed Technology LLC, San Francisco, CA (US)

(72) Inventors: Ian D. Gregorio-de Souza, Hanover, NH (US); Vincent H. Berk, Lyme, NH (US)

(73) Assignee: Riverbed Technology LLC, San Francisco, CA (US)

( * ) Notice: Subject to any disclaimer, the term of this patent is extended or adjusted under 35 U.S.C. 154(b) by 30 days.

(21) Appl. No.: 17/591,980

(22) Filed: Feb. 3, 2022

Related U.S. Application Data

(60) Provisional application No. 63/146,472, filed on Feb. 5, 2021.

(51) Int. Cl.
*G06F 11/34* (2006.01)
*G06F 11/07* (2006.01)

(52) U.S. Cl.
CPC ...... *G06F 11/3452* (2013.01); *G06F 11/0781* (2013.01); *G06F 11/3409* (2013.01)

(58) Field of Classification Search
CPC ............ G06F 11/3452; G06F 11/3447; G06F 11/3409; G06F 11/0781; G06F 11/3072; H04L 41/142; H04L 41/147; H04L 41/149; H04L 41/16; H04L 43/08
See application file for complete search history.

(56) References Cited

U.S. PATENT DOCUMENTS

| | | | |
|---|---|---|---|
| 2006/0020924 A1* | 1/2006 | Lo | H04L 41/5054 717/124 |
| 2008/0250265 A1* | 10/2008 | Chang | H04L 41/0663 714/4.12 |
| 2015/0212869 A1* | 7/2015 | Chen | G06F 11/0706 714/38.1 |
| 2019/0044824 A1* | 2/2019 | Yadav | H04L 41/147 |
| 2020/0257943 A1* | 8/2020 | Huber | G06N 7/01 |
| 2020/0364571 A1* | 11/2020 | Xu | G06N 3/084 |
| 2021/0160148 A1* | 5/2021 | Kolar | H04L 41/16 |
| 2022/0172076 A1* | 6/2022 | Kanza | G06N 3/044 |
| 2022/0292008 A1* | 9/2022 | Kavali | G06F 9/5027 |
| 2022/0321436 A1* | 10/2022 | Kandhasamy Narayanan | H04L 41/145 |

* cited by examiner

*Primary Examiner* — Gabriel Chu
(74) *Attorney, Agent, or Firm* — Park, Vaughan, Fleming & Dowler LLP; Laxman Sahasrabuddhe

(57) ABSTRACT

Metric data may be received, where the metric data may include one or more time series, where each time series may include a set of metric datapoints corresponding to a set of time slices, and where each metric datapoint may be a measurement of a metric of a monitored object in an infrastructure. An infrastructure health score may be computed for each time slice in the set of time slices based on the metric data. A machine learning (ML) model may be trained based on metric datapoints corresponding to at least a current time slice and the infrastructure health score corresponding to a future time slice. The trained ML model may then be used to predict a future infrastructure health score based on at least current metric datapoints.

16 Claims, 4 Drawing Sheets

USING MACHINE LEARNING TO PREDICT INFRASTRUCTURE HEALTH

RELATED APPLICATION

This application claims priority to U.S. Provisional Patent Application No. 63/146,472, filed on 5 Feb. 2021, the contents of which are herein incorporated by reference in their entirety for all purposes.

TECHNICAL FIELD

This disclosure generally relates to computer systems and networks. More specifically, this disclosure relates to using machine learning (ML) to predict infrastructure health.

BACKGROUND

The terms "computing infrastructure" or "infrastructure" may refer to a collection of computers and networks used by an organization. Numerous objects (which may include, but are not limited to, users, devices, applications, and networks) may be monitored and a variety of metrics may be collected for each monitored object. The metrics may be used to determine the health of the infrastructure.

SUMMARY

Embodiments described herein provide systems and techniques to use ML to predict infrastructure health. In some embodiments, metric data may be received, where the metric data may include one or more time series, where each time series may include a set of metric datapoints corresponding to a set of time slices, and where each metric datapoint may be a measurement of a metric of a monitored object in an infrastructure. An infrastructure health score may be computed for each time slice in the set of time slices based on the metric data. An ML model may be trained based on (1) metric datapoints corresponding to at least a current time slice and optionally past time slices, and (2) the infrastructure health score corresponding to a future time slice. The trained ML model may then be used to predict a future infrastructure health score based on at least current metric datapoints.

In some embodiments, computing the infrastructure health score may include one or more of: (1) scaling the set of metric datapoints to obtain a set of scaled metric datapoints, (2) mapping a subset of the set of scaled metric datapoints to a metric category selected from a set of metric categories, (3) generating different types of events for the metric category based on the subset of the set of scaled metric datapoints, and (4) computing a weighted average of counts of the different types of events.

In some embodiments, the ML model may include a set of metric category ML models corresponding to a set of metric categories and a combining ML model to combine outputs from the set of metric category ML models. In some embodiments, an ML model may be a neural network.

DETAILED DESCRIPTION

The following description is presented to enable any person skilled in the art to make and use the invention, and is provided in the context of a particular application and its requirements. Various modifications to the disclosed embodiments will be readily apparent to those skilled in the art, and the general principles defined herein may be applied to other embodiments and applications without departing from the spirit and scope of the present invention. Thus, the present invention is not limited to the embodiments shown, but is to be accorded the widest scope consistent with the principles and features disclosed herein. In this disclosure, when the term "and/or" is used with a list of entities, it refers to all possible combinations of the list of entities. For example, the phrase "X, Y, and/or Z" covers the following embodiments: (1) only X; (2) only Y; (3) only Z; (4) X and Y; (5) X and Z; (6) Y and Z; and (7) X, Y, and Z.

Figure 1:
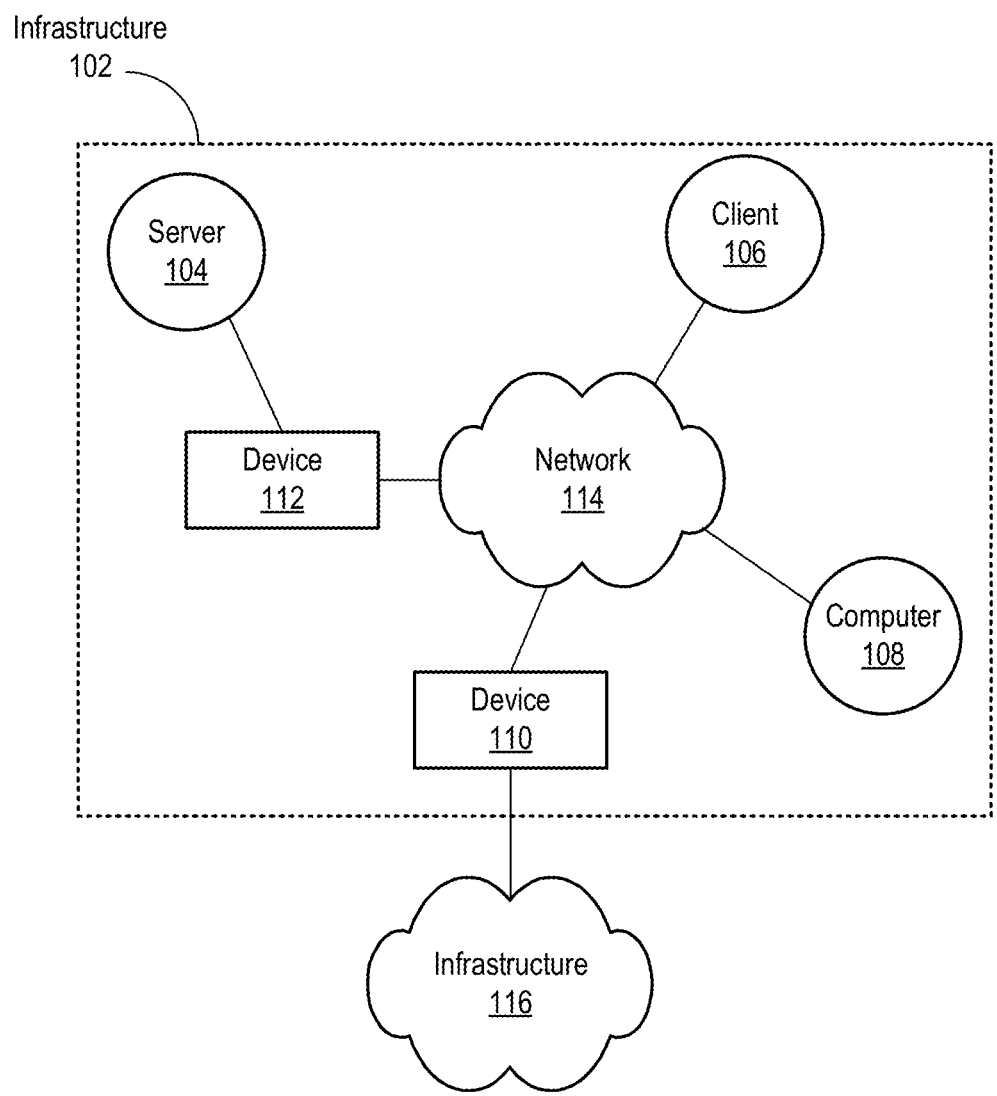
FIG. 1 illustrates an infrastructure in accordance with some embodiments described herein.

FIG. 1 illustrates an infrastructure in accordance with some embodiments described herein.

Infrastructure 102 may include server 104, client 106, computer 108, and devices 110 and 112, which may communicate with one another over network 114. Infrastructure 102 may be communicatively coupled with other infrastructures, e.g., infrastructure 102 may be communicatively coupled with infrastructure 116 through device 110. The infrastructure shown in FIG. 1 is for illustration purposes and is not intended to limit the scope of the disclosure. In general, an infrastructure may include thousands or millions of devices.

The term "device" may generally refer to any apparatus that can perform computations and communicate with other devices. In some embodiments, a device can include a processing mechanism that can execute instructions stored on a storage medium. Examples of devices include, but are not limited to, file servers, appliances, routers, switches, smartphones, handheld computers, laptop computers, desktop computers, distributed computers, and printers.

The term "network" may refer to multiple interconnected devices. A network can deliver information from one device (e.g., a server) to another device (e.g., a client computer). Examples of networks include, but are not limited to, wireless and wired networks, local area networks (LANs), metropolitan area networks (MANs), WANs, private networks, public networks, intranets, and internets.

Communication between two devices or nodes of a network is typically accomplished using a layered software architecture, which is often referred to as a networking software stack or a networking stack. A given functionality in a networking stack can be implemented using hardware or software or a combination thereof. The decision to implement a specific functionality in hardware or software is typically based on a tradeoff between performance and cost.

Each layer in a networking stack may be associated with one or more protocols which define the rules and conventions for processing packets in that layer. Each lower layer may perform a service for the layer immediately above it to help with processing packets, and each layer may add a header (control data) that allows peer layers to communicate with one another. At the sender, each layer may add layer specific headers to the packet as the packet moves from higher layers to lower layers. The receiver may process headers of each layer as the payload moves from the lowest layer to the highest layer.

A data link layer or link layer may refer to a layer that manages a communication channel between adjacent devices in the network. For example, if two routers are connected to each other via a cable, then the link layer may manage the communication channel between these two routers. Ethernet is an example of a link layer. A network layer may refer to a layer that enables communication between any two devices across the network. Internet Protocol (IP) layer is an example of a network layer that enables communication between two routers in an IP network.

Given the large number of performance metrics collected for an infrastructure, alerting and baselining notification based on individual metrics can create a high volume of events. High volumes of alerts and notifications may contribute to information overload, and alert fatigue. Embodiments described herein can reduce the burden and bring focus to a subset of events (alerts/notifications) that are problematic. In addition, embodiments described herein may provide a human operator an immediate starting point of triage, and an avenue to divide and conquer when there is an incident. Some embodiments described herein may predict future health metrics, which may serve as an early indicator for potential performance issues.

Embodiments described herein may generally be used for predicting any value or score that indicates the health of the infrastructure or the end-user experience. For example, the Application Performance Index (Apdex) score is an end-user satisfaction score that provides a clear and concise indication of user satisfaction based on collected user transaction time metrics (a description of Apdex Score may be found on the Apdex website, e.g, www.apdex.org). While the Apdex score gives the analyst a clear indication of degrading user experience (a 0.0 score corresponds to the worst experience and a 1.0 score corresponds to the best experience), it is based on static thresholds that may not reflect the dynamic nature of an environment. Moreover, the score is calculated for each transaction metric and therefore each score must be addressed individually. Calculating a score for each transaction metric may fail to reduce the search space when performing root cause analysis. This issue is compounded by the fact that not all metrics are equally relevant to infrastructure performance; an overloaded load balancer may have a much more significant impact on performance than an overloaded back-end server in the load balanced pool. Some embodiments described herein may determine an Apdex score or an Apdex-like score for a wide range of metrics including, but not limited to, timed transactions.

Some embodiments described herein compute a saturation, error, traffic, and latency health index, which is hereinafter referred to as the "SETL health index" or "SETL score." The SETL health index may group all or a subset of available metrics into four categories—saturation, error, traffic, and latency. Metrics in each of these groups may be monitored and processed to generate a set of events, e.g., acceptable events, minor events, and major events. The events generated may be used to create a set of uniform health scores for each category. Embodiments described herein may generally use any technique to group events, which may include, but are not limited to, a tournament-based technique to group individual events based on relevancy which may be trained based on their prediction accuracy. In some embodiments described herein, the metric data that is used to calculate the score and the calculated score may be used as training data for an ML engine. The ML engine, once trained, may then be used to generate health score predictions.

Figure 2:
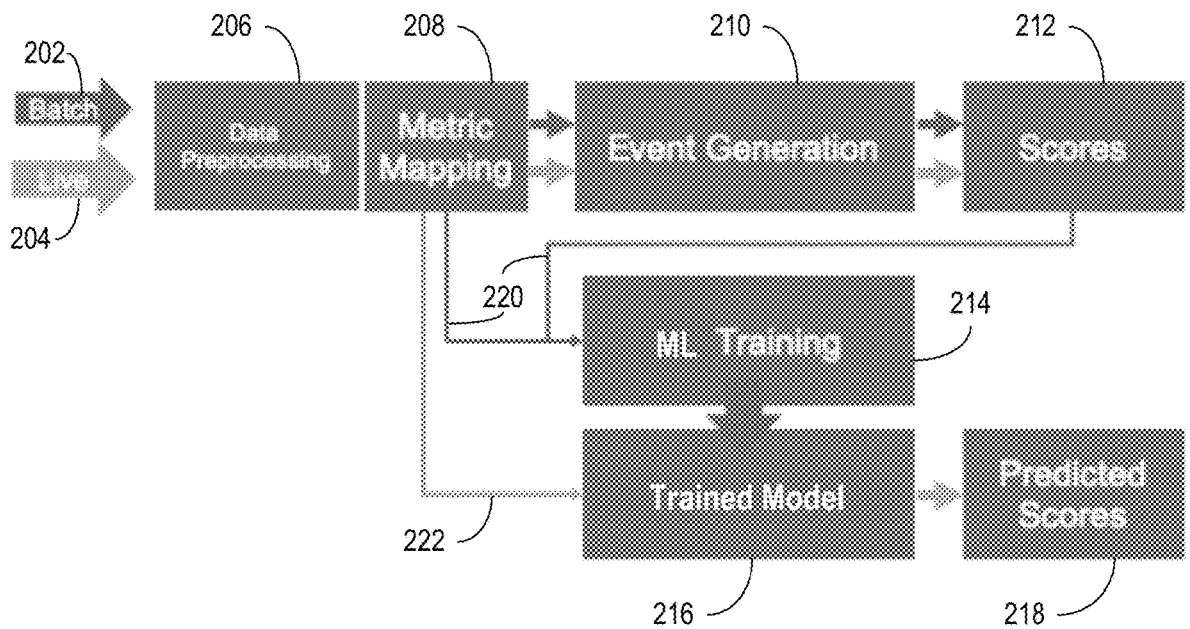
FIG. 2 illustrates a process for using ML to predict infrastructure health in accordance with some embodiments described herein.

FIG. 2 illustrates a process for using ML to predict infrastructure health in accordance with some embodiments described herein.

Data preprocessing (at 206) may be performed on batch data 202, which may be raw telemetry data that is collected from monitored objects. Data preprocessing (at 206) may normalize and/or perform scaling. Normalization may help transform the raw telemetry data into metrics values on a standardized scale. Operations that may be performed during normalization include, but are not limited to, scaling the data using a minimum-maximum scaler to produce values between 0.0 and 1.0. A minimum-maximum scaler may determine the minimum and maximum value for a given monitored metric (e.g., transaction latency) in the batch data 202. Next, each metric value may be scaled (using a linear or non-linear function) so that the minimum value maps to a 0.0 value and the maximum value maps to a 1.0 value. Another technique that may be used either on its own or in conjunction with other techniques is differencing. In differencing, the difference between two consecutive datapoints in a time series may be used instead of using the absolute values of the datapoints in the time series. In general data preprocessing (at 206) may include any technique to transform the raw telemetry data. Using transformed data instead of the raw telemetry data may improve training and/or stability of the ML model.

After preprocessing, the metrics may be mapped to a set of categories. In some embodiments, the preprocessed metric values may be mapped to the following four categories: saturation, error, traffic, and latency. The saturation category may refer to a measure of utilization level for a monitored object that shows how occupied, busy, or full the monitored object is in terms of resources. Examples of metrics that may be mapped to the saturation category include, but are not limited to, processor utilization and memory utilization. The error category may refer to a measure of error occurrences, counts, or rates. Examples of metrics that may be mapped to the error category include, but are not limited to, packet loss, disk read errors, and disk write errors. The traffic category may refer to a measure of network usage. Examples of metrics that may be mapped to the traffic category may include, but are not limited to, data and/or transaction request counts and/or rates, data transfer rates and/or bandwidths, and throughputs. The latency category may refer to a measurements of transaction times that indicates how fast or slow an object responds or performs a task. In general, a latency may be defined as the time delay between two corresponding events. Examples of metrics that may be mapped to the latency category include, but are not limited to, response latency, transaction latency, and round-trip times. In some embodiments described herein, a user may use their domain knowledge to map a metric to a category. In some embodiments described herein, a metric may be mapped to multiple categories.

Event generation (at 210) may then be performed based on the mapped metric values. Specifically, a time duration may be partitioned into a set of time slices, which may be of a fixed duration or a variable duration. Next, events may be generated for each time slice. Specifically, an event may be selected from a set of events based on the metric. In some embodiments described herein, the set of events may include three categories of events: acceptable events, minor events, and major events. The metric value in a time slice may be used to generate an event for that time slice. For example, acceptable, minor, and major events may be generated for a round-trip time (RTT) metric based on the following fixed RTT thresholds: RTT <30 ms, 30 ms >=RTT <120 ms, and RTT >=120 ms. Event generation (at 210) may generally be performed using techniques that include, but are not limited to, static or dynamic baseline thresholding, outlier and/or anomaly detection, and change detection.

Scores may be computed (at 212) based on the generated events. Specifically, health scores may be computed for each category based on the events generated for the metrics. For example, the following formula may be used to generate a score based on the number of acceptable, minor, and major event counts that were generated during a time duration:

$$Score = \frac{1.0 * AcceptableEventCount + 0.5 * MinorEventCount + 0.0 * MajorEventCount}{TotalEventCount}$$

where, SETL Score=[$Score_{saturation}$/$Score_{error}$/$Score_{traffic}$/$Score_{latency}$].

In other words, the generated events (e.g., the count of acceptable, minor, and major events) may be used to compute a score for each category (e.g., a score for saturation, error, traffic, and latency).

The metrics values (at 208) and the scores (at 212) may then be used to generate sliding windowed training data 220 for training a supervised ML model. A sequence of metric timeseries may be used as the features and the calculated scores may be used as the labels during ML training 214. Specifically, an input sequence length X and prediction/forecast length Y may be selected. Next, for a given period of time T covering N metric measurements, where N may be much greater than X, slice data windows of length X {$t_1$, $t_2$ ... $t_x$} and corresponding SETL scores for time slice $t_{x+j}$ where j is at least 1 (and up to $t_{x+y}$ if training for multistep predictions). Similar windows may be created by shifting the beginning time slot by one, i.e., the next window of data starts at {$t_2$, $t_3$, ... $t_{x+1}$}, and so on. Batches of windowed data may then be created for training the ML models. Each batch may include B windowed data samples created and may be used to train an ML model.

Figure 3:
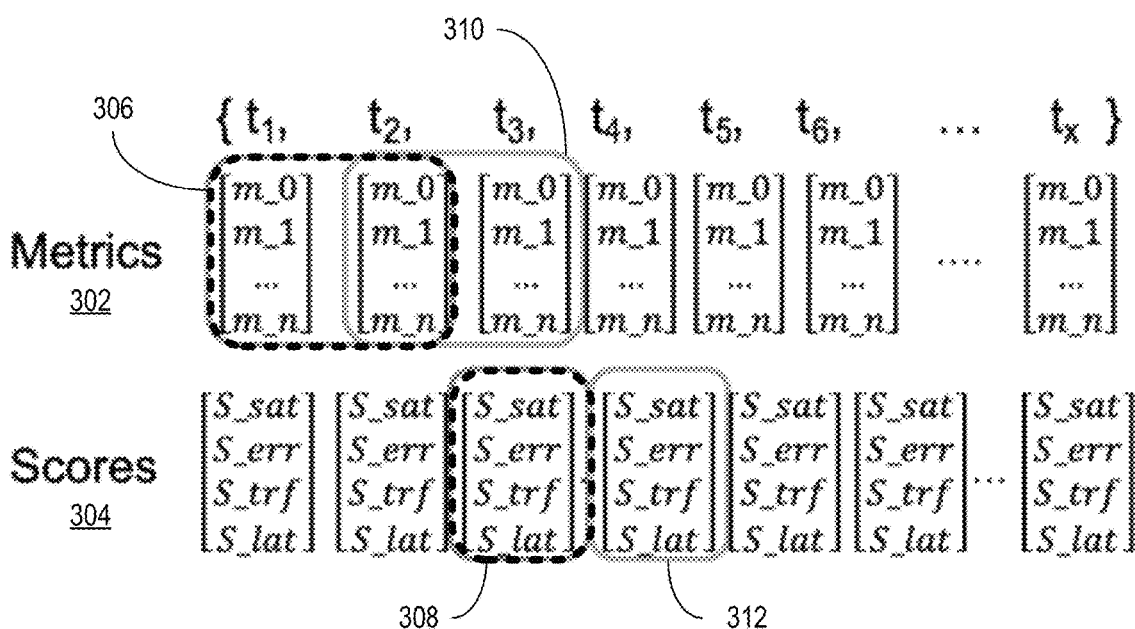
FIG. 3 illustrates training data that may be used to train an ML model in accordance with some embodiments described herein.

FIG. 3 illustrates training data that may be used to train an ML model in accordance with some embodiments described herein.

Metrics 302 may be generated by metric mapping 208 processing stage, and scores 304 may be generated by scores 212 processing stage. Metric data may be generated for each time slice. For example, metrics m_0 through m_n may be generated for time slices $t_1$ through $t_x$. Likewise, scores may be generated for each time slice. For example, scores S_sat, S_err, S_trf, and S_lat may be generated for time slices $t_1$ through $t_x$. Next, an ML model may be trained using metric data for a set of time slices as the features and score data for a future time slice as the label. For example, metric data 306 from time slices $t_1$ and $t_2$ may be used as the features, and scores 308 from time slice $t_3$ may be used as the label for training an ML model. Likewise, metric data 310 from time slices $t_2$ and $t_3$ may be used as the features, and scores 312 from time slice $t_4$ may be used as the label for training an ML model. In other words, the ML model may be trained to predict the score for a future time slice (e.g., the score for time slice $t_3$) based on the metric data for a current time slice (e.g., metric data for time slice $t_2$) and optionally one or more past time slices (e.g., metric data for time slice $t_1$).

Next, ML training 214 may be performed based on the training data. In some embodiments described herein, an ensemble of neural networks may be trained to predict health scores. The ensemble of neural networks may generally include any neural network architecture suitable for making predictions based on a sequence of multivariable time series. Examples of ML models that may be used during ML training 214 include, but are not limited to, recurrent neural networks, long short-term memory (LSTM) neural networks, convolutional neural networks, and combinations of different types of neural networks.

Once ML training 214 completes, the resulting trained model 216 may be used to perform predictions. Specifically, the same data processing (at 206) and metric mapping (at 208) path that was used for generating the training data may be used to preprocess (at 206) and map (at 208) live telemetry data 204. The resulting metric data 222 may be provided as input to the trained model 216, which may generate predicted scores 218. The predicted scores 218 may be used to warn a user or a management system that the infrastructure health is expected to deteriorate beyond an acceptable level. In response, the user or the management system may perform remedial actions to prevent the infrastructure health from deteriorating.

Embodiments described herein may combine information from multiple metrics into a uniform score that is easily understood by an operator and can be easily attributed to relevant metrics. Embodiments described herein allow for a variety of different event generation techniques to feed the score. Event generation techniques include, but are not limited to, anomaly detectors, change detectors, and clustering techniques such as K-means clustering. Embodiments described herein can allow a predicted score to be traced back to an interaction between a subset of relevant metrics. In addition to teasing out which metrics most impact performance, embodiments described herein can reliably predict how performance will change in the future, or how performance will be impacted as metrics hypothetically change. Embodiments described herein can use non-timing-based metrics and combine scores from different metrics into a set of scoring categories.

In this disclosure, ML may generally refer to computational techniques and systems that learn how to make accurate predictions based on training data. ML may be implemented using an ML model. Once the ML model has been trained, it may be validated, and then used to predict output values based on input values.

Figure 4:
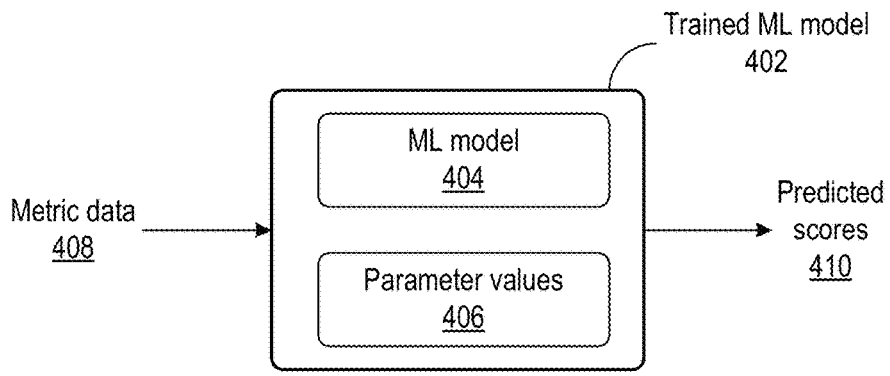
FIG. 4 illustrates an ML model in accordance with some embodiments described herein.

FIG. 4 illustrates an ML model in accordance with some embodiments described herein.

Trained ML model 402 may generate a predicted score 410 based on metric data 408. Specifically, trained ML model 402 may include ML model 404 and parameter values 406. ML model 404 may use parameter values 406 to perform computations on the metric data 408, and the results of these computations may be provided as the predicted scores 410. During training, the supervised ML process may modify ML model 404 and/or parameter values 406. An error function or loss function may be defined based on a difference between the predicted score (as computed by the current state of ML model 404 and parameter values 406) and the actual score at a future time slice. The supervised ML process may modify ML model 404 and/or parameter values 406 to reduce the error function value or loss function value. Trained ML model 402 is obtained once the supervised ML process completes training.

Figure 5:
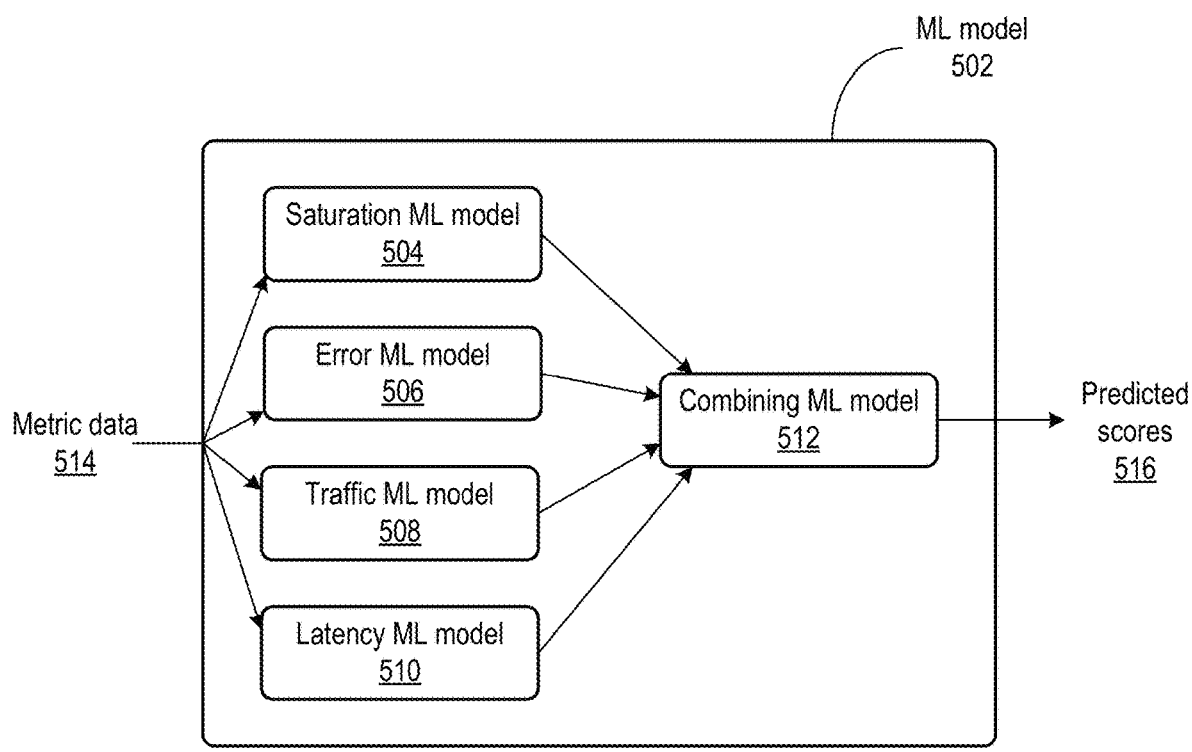
FIG. 5 illustrates an ML model implementation in accordance with some embodiments described herein.

FIG. 5 illustrates an ML model implementation in accordance with some embodiments described herein.

ML model 502 may include a set of metric category ML models corresponding to a set of metric categories. For example, ML model 502 may include saturation ML model 504, error ML model 506, traffic ML model 508, and latency ML model 510. ML model 502 may also include combining ML model 512 which generates predicted scores 516 by combining the outputs from the set of metric category ML models. In a first training stage, metric data 514 belonging to a metric category may be provided as input to the metric category ML model corresponding to the metric category. In other words, each metric category ML model may be trained independently and in parallel. Once trained, the metric category ML models may be frozen, i.e., the metric category ML models are not changed in the second training stage. In the second training stage, combining ML model 512 may be trained by providing metric data 514 as inputs to the frozen metric category ML models and the infrastructure score as the output to combining ML model 512.

Figure 6:
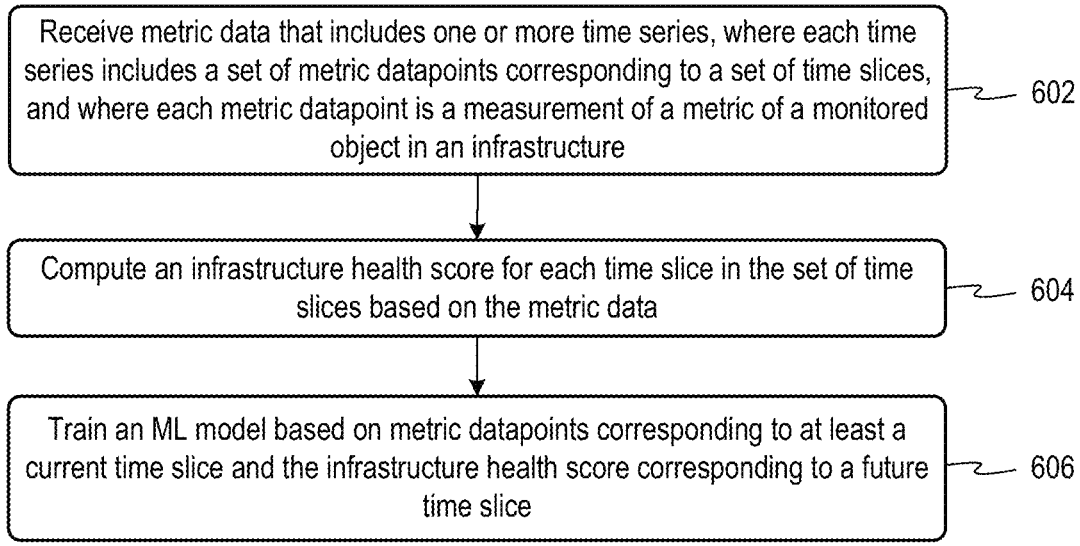
FIG. 6 illustrates a process for training an ML model that can predict infrastructure health in accordance with some embodiments described herein.

FIG. 6 illustrates a process for training an ML model that can predict infrastructure health in accordance with some embodiments described herein.

Metric data that includes one or more time series may be received, where each time series includes a set of metric datapoints corresponding to a set of time slices, and where each metric datapoint is a measurement of a metric of a monitored object in an infrastructure (at 602). An infrastructure health score may be computed for each time slice in the set of time slices based on the metric data (at 604). In some embodiments, computing the infrastructure health score may include (1) scaling the set of metric datapoints to obtain a set of scaled metric datapoints, (2) mapping a subset of the set of scaled metric datapoints to a metric category selected from a set of metric categories, (3) generating different types of events for the metric category based on the subset of the set of scaled metric datapoints, and (4) computing a weighted average of counts of the different types of events.

An ML model may be trained based on metric datapoints corresponding to at least a current time slice and the infrastructure health score corresponding to a future time slice (at 606). In some embodiments, the ML model may include a set of metric category ML models corresponding to a set of metric categories and a combining ML model to combine outputs from the set of metric category ML models. In some embodiments, an ML model may be a neural network.

Figure 7:
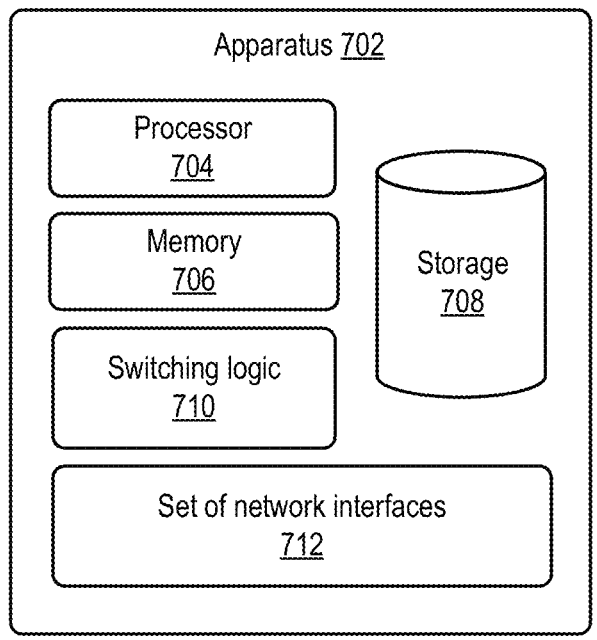
FIG. 7 illustrates an apparatus in accordance with some embodiments described herein.

FIG. 7 illustrates an apparatus in accordance with some embodiments described herein. Apparatus 702 (e.g., a device, a file server, etc.) can include processor 704, memory 706 (e.g., a volatile or non-volatile random access memory), and storage 708 (e.g., a flash memory device or a disk drive). Storage 708 can store data and executable code. The components in apparatus 702 can communicate with one another using a communication mechanism (not shown in FIG. 7), e.g., a bus, a backplane, and/or a switching fabric. Executable code stored in storage 708 can include instructions that, when executed by processor 704, cause apparatus 702 to perform one or more methods that are implicitly or explicitly described in this disclosure. Storage 708 can also store any data that is required by any processes that are performed by apparatus 702.

Apparatus 702 can also include switching logic 710 and set of network interfaces 712. Set of network interfaces 712 can be used to transmit data to and/or receive data from other communication devices. Switching logic 710 can forward network traffic received on one or more network interfaces in accordance with switching/forwarding/routing information stored in apparatus 702. Specifically, switching logic 710 can be configured by processor 704 in accordance with one or more methods that are implicitly or explicitly described in this disclosure.

The data structures and code described in this disclosure can be partially or fully stored on a non-transitory computer-readable storage medium and/or a hardware module and/or hardware apparatus. A non-transitory computer-readable storage medium includes all computer-readable storage mediums with the sole exception of a propagating electromagnetic wave or signal. Specifically, a non-transitory computer-readable storage medium includes, but is not limited to, volatile memory, non-volatile memory, magnetic and optical storage devices such as disk drives, magnetic tape, CDs (compact discs), DVDs (digital versatile discs or digital video discs), or other media, now known or later developed, that are capable of storing code and/or data. Hardware modules or apparatuses described in this disclosure include, but are not limited to, application-specific integrated circuits (ASICs), field-programmable gate arrays (FPGAs), dedicated or shared processors, and/or other hardware modules or apparatuses now known or later developed.

The methods and processes described in this disclosure can be partially or fully embodied as code and/or data stored in a non-transitory computer-readable storage medium or device, so that when a computer system reads and executes the code and/or data, the computer system performs the associated methods and processes. The methods and processes can also be partially or fully embodied in hardware modules or apparatuses. Note that the methods and processes can be embodied using a combination of code, data, and hardware modules or apparatuses.

The foregoing descriptions of embodiments of the present invention have been presented only for purposes of illustration and description. They are not intended to be exhaustive or to limit the present invention to the forms disclosed. Accordingly, many modifications and variations will be apparent to practitioners skilled in the art. Additionally, the above disclosure is not intended to limit the present invention. The scope of the present invention is defined by the appended claims.

What is claimed is:

1. A method, comprising:
receiving metric data comprising one or more time series, wherein each time series comprises a set of metric datapoints corresponding to a set of time slices, and wherein each metric datapoint is a measurement of a metric of a monitored object in an infrastructure;
computing an infrastructure health score for each time slice in the set of time slices based on the metric data; and
training, by a processor, a machine learning (ML) model based on metric datapoints corresponding to at least a current time slice and the infrastructure health score corresponding to a future time slice, wherein the ML model includes a set of metric category neural networks corresponding to a set of metric categories and a combining neural network to combine outputs from the set of metric category neural networks, wherein said training the ML model includes training the set of metric category neural networks in a first training stage and training the combining neural network in a second training stage, and wherein the set of metric category neural networks are not modified in the second training stage.

2. The method of claim 1, wherein said computing the infrastructure health score comprises scaling the set of metric datapoints using a minimum-maximum scaler to obtain a set of scaled metric datapoints.

3. The method of claim 2, wherein said computing the infrastructure health score comprises mapping a subset of the set of scaled metric datapoints to a metric category selected from a set of metric categories which include saturation, error, traffic, and latency.

4. The method of claim 3, wherein said computing the infrastructure health score comprises generating different types of events for the metric category based on the subset of the set of scaled metric datapoints.

5. The method of claim 4, wherein said computing the infrastructure health score comprises computing a weighted average of counts of the different types of events.

6. The method of claim 1, further comprising using the ML model to predict a future infrastructure health score based on at least current metric datapoints.

7. A non-transitory computer-readable storage medium storing instructions that, when executed by a processor, cause the processor to:
receive metric data comprising one or more time series, wherein each time series comprises a set of metric data points corresponding to a set of time slices, and wherein each metric data point is a measurement of a metric of a monitored object in an infrastructure;
compute an infrastructure health score for each time slice in the set of time slices based on the metric data; and
train a machine learning (ML) model based on metric data points corresponding to at least a current time slice and the infrastructure health score corresponding to a future time slice, wherein the ML model includes a set of metric category neural networks corresponding to a set of metric categories and a combining neural network to combine outputs from the set of metric category neural networks, wherein said training the ML model includes training the set of metric category neural networks in a first training stage and training the combining neural network in a second training stage, and wherein the set of metric category neural networks are not modified in the second training stage.

8. The non-transitory computer readable storage medium of claim 7, wherein said computing the infrastructure health score comprises scaling the set of metric datapoints using a minimum-maximum scaler to obtain a set of scaled metric datapoints.

9. The non-transitory computer readable storage medium of claim 8, wherein said computing the infrastructure health score comprises mapping a subset of the set of scaled metric datapoints to a metric category selected from a set of metric categories which include saturation, error, traffic, and latency.

10. The non-transitory computer readable storage medium of claim 9, wherein said computing the infrastructure health score comprises generating different types of events for the metric category based on the subset of the set of scaled metric data points.

11. The non-transitory computer readable storage medium of claim 10, wherein said computing the infrastructure health score comprises computing a weighted average of counts of the different types of events.

12. An apparatus, comprising:
a memory storing instructions; and
a processor, coupled to the memory and to execute the instructions, the instructions when executed cause the processor to:
receive metric data comprising one or more time series, wherein each time series comprises a set of metric datapoints corresponding to a set of time slices, and wherein each metric datapoint is a measurement of a metric of a monitored object in an infrastructure;
compute an infrastructure health score for each time slice in the set of time slices based on the metric data; and
train a machine learning (ML) model based on metric datapoints corresponding to at least a current time slice and the infrastructure health score corresponding to a future time slice, wherein the ML model includes a set of metric category neural networks corresponding to a set of metric categories and a combining neural network to combine outputs from the set of metric category neural networks, wherein said training the ML model includes training the set of metric category neural networks in a first training stage and training the combining neural network in a second training stage, and wherein the set of metric category neural networks are not modified in the second training stage.

13. The apparatus of claim 12, wherein said computing the infrastructure health score comprises scaling the set of metric datapoints to obtain a set of scaled metric datapoints.

14. The apparatus of claim 13, wherein said computing the infrastructure health score comprises mapping a subset of the set of scaled metric datapoints to a metric category selected from a set of metric categories.

15. The apparatus of claim 14, wherein said computing the infrastructure health score comprises generating different types of events for the metric category based on the subset of the set of scaled metric datapoints.

16. The apparatus of claim 15, wherein said computing the infrastructure health score comprises computing a weighted average of counts of the different types of events.

* * * * *